United States Patent [19]
Pisano et al.

[11] Patent Number: 6,029,647
[45] Date of Patent: Feb. 29, 2000

[54] RECUPERATIVE RADIANT TUBE WITH HOT SIDE VITIATION

[75] Inventors: Stephen P. Pisano, Cranberry Township, County of Butler; Harry P. Finke, Pittsburgh, both of Pa.

[73] Assignee: Bloom Engineering Company, Inc., Pittsburgh, Pa.

[21] Appl. No.: 09/111,106

[22] Filed: Jul. 6, 1998

Related U.S. Application Data

[63] Continuation-in-part of application No. 08/705,776, Aug. 30, 1996, Pat. No. 5,775,317.

[51] Int. Cl.[7] .................................................. F23D 21/00
[52] U.S. Cl. ............................. 126/91 A; 431/5; 431/11; 431/215; 431/115; 432/209
[58] Field of Search .................................. 431/11, 215, 5, 431/211, 115, 116; 261/75, 76, DIG. 75; 126/91 A; 432/181, 180, 209, 212; 165/4, 108, 909, DIG. 364; 60/308

[56] References Cited

U.S. PATENT DOCUMENTS

| | | | |
|---|---|---|---|
| 3,079,910 | 3/1963 | Bloom et al. | 126/91 |
| 3,262,484 | 7/1966 | Hess | 158/7.6 |
| 3,397,028 | 8/1968 | Brauer | 431/115 |
| 3,908,628 | 9/1975 | Lazaridis et al. | 126/91 A |
| 3,920,383 | 11/1975 | Kerr | 432/223 |
| 4,310,303 | 1/1982 | Collier | 432/209 |
| 4,445,842 | 5/1984 | Syska | 431/115 |
| 4,479,535 | 10/1984 | Echigo et al. | 165/142 |
| 4,524,752 | 6/1985 | Clarke | 126/91 A |
| 4,601,655 | 7/1986 | Riley et al. | 431/116 |
| 4,673,348 | 6/1987 | Riley et al. | 431/115 |
| 4,800,866 | 1/1989 | Finke | 126/91 A |
| 5,304,059 | 4/1994 | Tanaka et al. | 431/170 |
| 5,775,317 | 7/1998 | Finke | 431/115 |

FOREIGN PATENT DOCUMENTS

| | | | |
|---|---|---|---|
| 52-44805 | 11/1977 | Japan . | |
| 53-69932 | 6/1978 | Japan . | |
| 0107811 | 8/1980 | Japan | 431/116 |
| 56-12904 | 2/1981 | Japan . | |
| 0926429 | 5/1982 | U.S.S.R. | 126/91 A |

OTHER PUBLICATIONS

"New Gas Radiant Tubes", E.V. Kreinin, All–Union Scientific–Research Institute of the Gas Industry, (Translated from Metallovedenie i Termicheskaya Obrabotka Metallov, No. 5, pp. 23–26, May 1978).

*Primary Examiner*—Carl D. Price
*Attorney, Agent, or Firm*—Webb Ziesenheim Logsdon Orkin & Hanson, P.C.

[57] ABSTRACT

A radiant tube assembly comprises a radiant tube having a burner leg, an exhaust leg and a recuperator inside the exhaust leg and in a stream of products of combustion flowing in the exhaust leg. The recuperator has an air intake port at a first end and a mixing baffle at a second, hot end. The mixing baffle causes combustion air and products of combustion to be mixed at the hot end of the recuperator and provided to the burner leg for combustion. The mixing baffle includes a flow director which increases the amount of products of combustion mixed with the combustion air. The mixing baffle can also include a dome-shaped end which extends into the stream of products of combustion for reducing turbulence of the stream of products of combustion flowing in the exhaust leg.

21 Claims, 5 Drawing Sheets

6,029,647

RECUPERATIVE RADIANT TUBE WITH HOT SIDE VITIATION

CROSS REFERENCE TO RELATED APPLICATION

This application is a continuation-in-part of U.S. application Ser. No. 08/705,776, filed Aug. 30, 1996 and entitled "Recuperative Radiant Tube With Hot Side Vitiation", issued as U.S. Pat. No. 5,775,317 on Jul. 7, 1998.

BACKGROUND OF THE INVENTION

1. Field of the Invention

The present invention relates to radiant tube burners and more particularly to recuperative radiant tube burners which utilize vitiation to reduce NOX emissions.

2. Description of the Prior Art

The need to minimize the formation of oxides of nitrogen during combustion has become a requirement of many applications of fire heaters, boilers, oil field steamers, and the like. That requirement also applies to heat treating furnaces and other applications which utilize radiant tube burners as the process heat source.

It is known that there are two basic sources of NOX formation, mainly from the nitrogen in the air and further from fuel bound nitrogen. The probable use of newly available synfuels which contain large amounts of combined nitrogen as well as the increase in the need to conserve energy further increases the demand for low NOX emissions.

Various forms of staged combustion and lower flame temperatures have been employed with conventional burners to reduce NOX emissions. Moreover, various forms of apparatus have been utilized to vitiate combustion air with products of combustion to lower flame temperature. One such apparatus is disclosed in Japanese laid-open patent application number 52-44805 wherein a portion of products of combustion flowing in an exhaust leg are caused to be mixed outside the furnace with the combustion air being provided to the burner. Another such apparatus is illustrated in Japanese laid-open patent application number 56-12904 wherein a recuperator is positioned in a stream of products of combustion. Combustion air is directed inside the recuperator to be heated by heat transferred to the tube by the products of combustion. The heated air is then mixed outside the furnace with a portion of the products of combustion. The mixture is then provided to the burner leg for combustion.

There remains a need for a radiant tube burner assembly which efficiently reduces NOX emissions.

SUMMARY OF THE INVENTION

Accordingly, we have invented a recuperator for a radiant tube burner assembly. The recuperator includes an air tube located within and radially spaced from an exhaust leg of the radiant tube burner assembly. The air tube and the exhaust leg form a first annular passage for conveying products of combustion in a first direction. The air tube has an outer end connected to a source of air and an inner end. A mixing tube is located within and radially spaced from the air tube. The mixing tube and the air tube form a second annular passage for conveying air in a second direction, opposite the first direction. The mixing tube has an outer end connected in fluid communication with an air duct of the radiant tube burner assembly and an inner end. A mixing baffle is positioned at the inner end of the air tube and the inner end of the mixing tube. The mixing baffle has a restriction located at the inner end of the mixing tube for restricting the flow of air passing from the air tube into the mixing tube. A conduit is positioned adjacent the restriction for providing fluid communication between the first annular passage and the mixing tube. A flow director is positioned in the first annular passage adjacent the conduit. The flow director is configured to direct into the conduit the flow of products of combustion flowing in the first annular passage. The restriction causes an increase in velocity of air flowing therethrough from the air tube to the mixing tube. This increase in velocity causes a pressure differential between the mixing tube and the exhaust leg to draw products of combustion from the first annular passage into the mixing tube through the conduit.

We have also invented a recuperative radiant tube apparatus for use with a furnace having a furnace wall defining an inside and an outside of the furnace. The recuperative radiant tube apparatus includes a burner leg projecting through the furnace wall and having an end inside the furnace and an end outside the furnace, an exhaust leg projecting through the furnace wall and having an end inside the furnace and an end outside the furnace, a connecting leg connecting the end of the burner leg inside the furnace and the end of the exhaust leg inside the furnace and a duct connecting the end of the burner leg outside the furnace and the end of the exhaust leg outside the furnace. A recuperator is positioned inside the exhaust leg. The recuperator includes a first tube disposed in and radially spaced from the exhaust leg forming an annular exhaust gas passage therebetween. The first tube has an outer end positioned adjacent the end of the exhaust leg outside the furnace and an inner end opposite the outer end of the first tube and extending towards the connecting leg. An inlet port is positioned adjacent the outer end of the first tube. The inlet port connects the inside of the first tube to a source of combustion air. A second tube is disposed in and radially spaced from the first tube to form an annular air passage therebetween. The annular air passage connects the source of combustion air to the inner end of the first tube. A mixing baffle is positioned between the inner end of the first tube and the inner end of the second tube. The mixing baffle includes a jet pump positioned at the inner end of the second tube for increasing the velocity of combustion air flowing from the annular air passage into the second tube. At least one port is positioned adjacent the jet pump, connecting the inside of the second tube to the annular exhaust gas passage. The at least one port provides a path for exhaust gas flowing in the annular gas passage to enter the second tube, wherein the exhaust gas is mixed with combustion air. The duct conveys the mixture of exhaust gas and combustion air to the burner leg for combusting with fuel in the burner leg. A flow director is positioned in the annular exhaust gas passage adjacent the at least one port for directing into the at least one port exhaust gas flowing in the annular exhaust gas passage.

We have also invented a mixing baffle positionable in a furnace exhaust tube of a radiant tube burner assembly. The mixing baffle includes a body having a first end, a second end and a side extending therebetween. A jet pump is positioned inside the body adjacent the first end. The jet pump and the body define a channel therebetween. The jet pump has a graduated passage extending therethrough between the first end and the second end of the body and in fluid communication with the channel. A conduit extends between the side of the body and a position adjacent the graduated passage. A flow director is positioned on the body adjacent the conduit. The flow director is configured so that when the mixing baffle is positioned in the furnace exhaust tube, the flow director directs into the conduit products of combustion flowing in the furnace exhaust tube.

The flow director can be a cowl which defines with the body an opening which is positioned facing the second end of the body. The cowl and hollow body also define a graduated passage from the opening to the conduit.

The flow director can also be a wall positioned between the conduit and the first end of the hollow body. The wall has a receiving surface positioned facing the second end of the hollow body and the receiving surface partially surrounds the conduit.

The second end of the hollow body can have a hemispherical shape.

An advantage of the present invention is that the flow directors increase the amount of products of combustion mixed with the combustion air.

Another advantage of the present invention is that the hemispherical shape of the end of the mixing baffle extending upstream in the flow of products of combustion reduces or eliminates undesirable turbulence in the flow of products of combustion in the exhaust leg of the radiant tube assembly.

Still further advantages of the present invention will become apparent to those of ordinary skill in the art upon reading and understanding the following detailed description of the preferred embodiment.

BRIEF DESCRIPTION OF THE DRAWINGS

FIG. 4b is a section view taken along line IV—IV of FIG. 4a;

FIG. 5b is a section view taken along lines V—V of FIG. 5a.

DETAILED DESCRIPTION OF THE PREFERRED EMBODIMENTS

Figure 1:
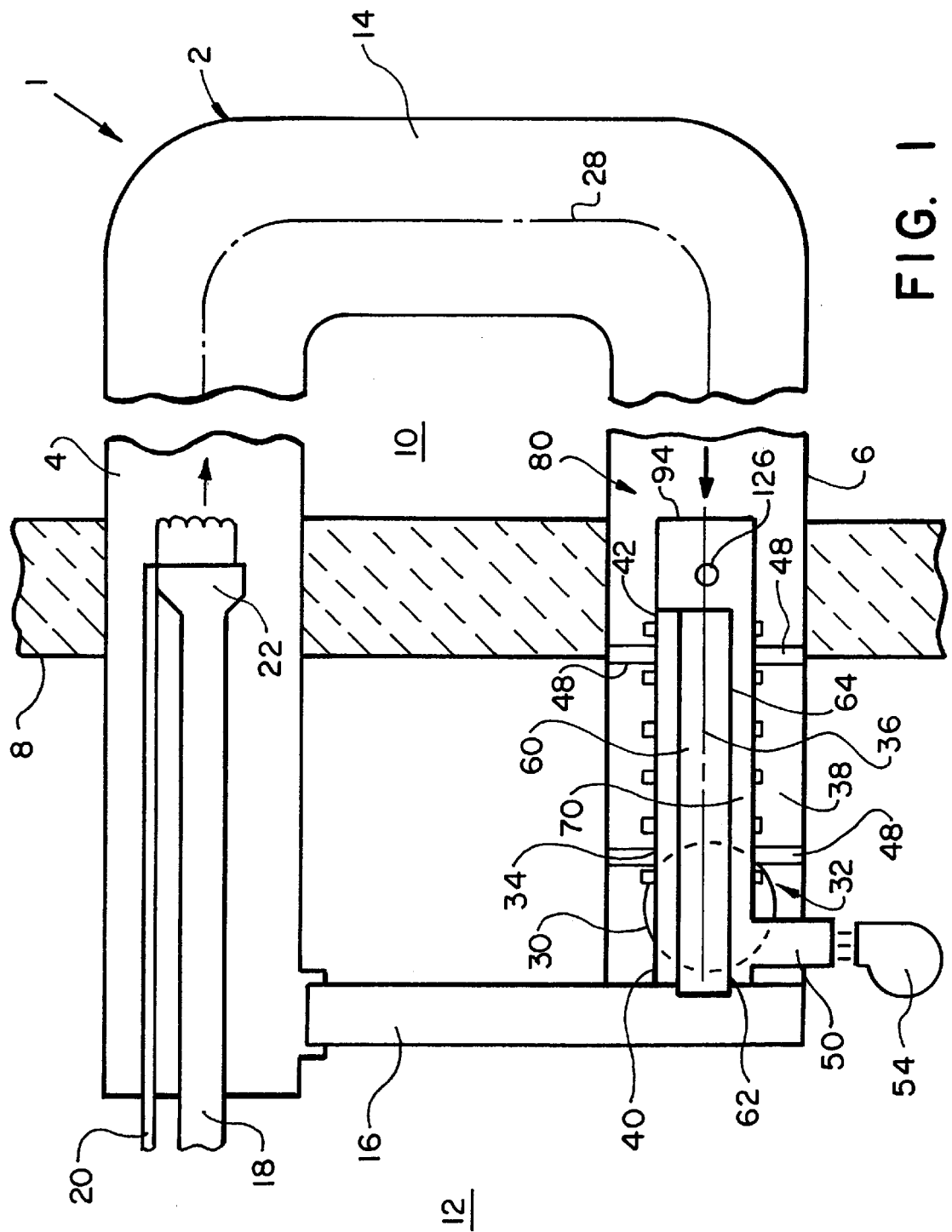
FIG. 1 is a broken plan view of a radiant tube assembly showing a recuperator in accordance with the present invention.

With reference to FIG. 1 of the drawings, a U-shaped radiant tube heater assembly 1 includes a radiant tube 2 including a burner tube or leg 4 and an exhaust tube or leg 6. The burner leg 4 and the exhaust leg 6 extend through a furnace wall 8 defining the inside 10 and the outside 12 of a furnace. A connecting tube or leg 14 disposed on the inside 10 of the furnace connects the inner end of the burner leg 4 to the inner end of the exhaust leg 6. A plenum or duct 16 disposed on the outside 12 of the furnace connects the outer end of the burner leg 4 to the outer end of the exhaust leg 6.

The burner leg 4 of the radiant tube 2 has a fuel tube 18 for providing a fuel, such as oil or gas, into the radiant tube 2 and an ignitor 20 for initiating the fuel provided by the fuel tube 18. A flame stabilizer 22 is positioned at the discharge end of the fuel tube 18 for distributing combustion air uniformly around the stream of fuel. The flame stabilizer 22 also creates a partial vacuum between the stream of fuel and the stream of combustion air to promote flame stability. The ignition of fuel and air 26 in the burner leg 4 of the radiant tube 2 produces a stream of products of combustion 28 that flow from the burner leg 4, to the exhaust leg 6 via the connecting leg 14. The exhaust leg 6 of the radiant tube 2 is connected to an exhaust port 30 (shown in phantom) adjacent to the outer end thereof for exhausting the products of combustion 28 to the atmosphere.

Figure 2:
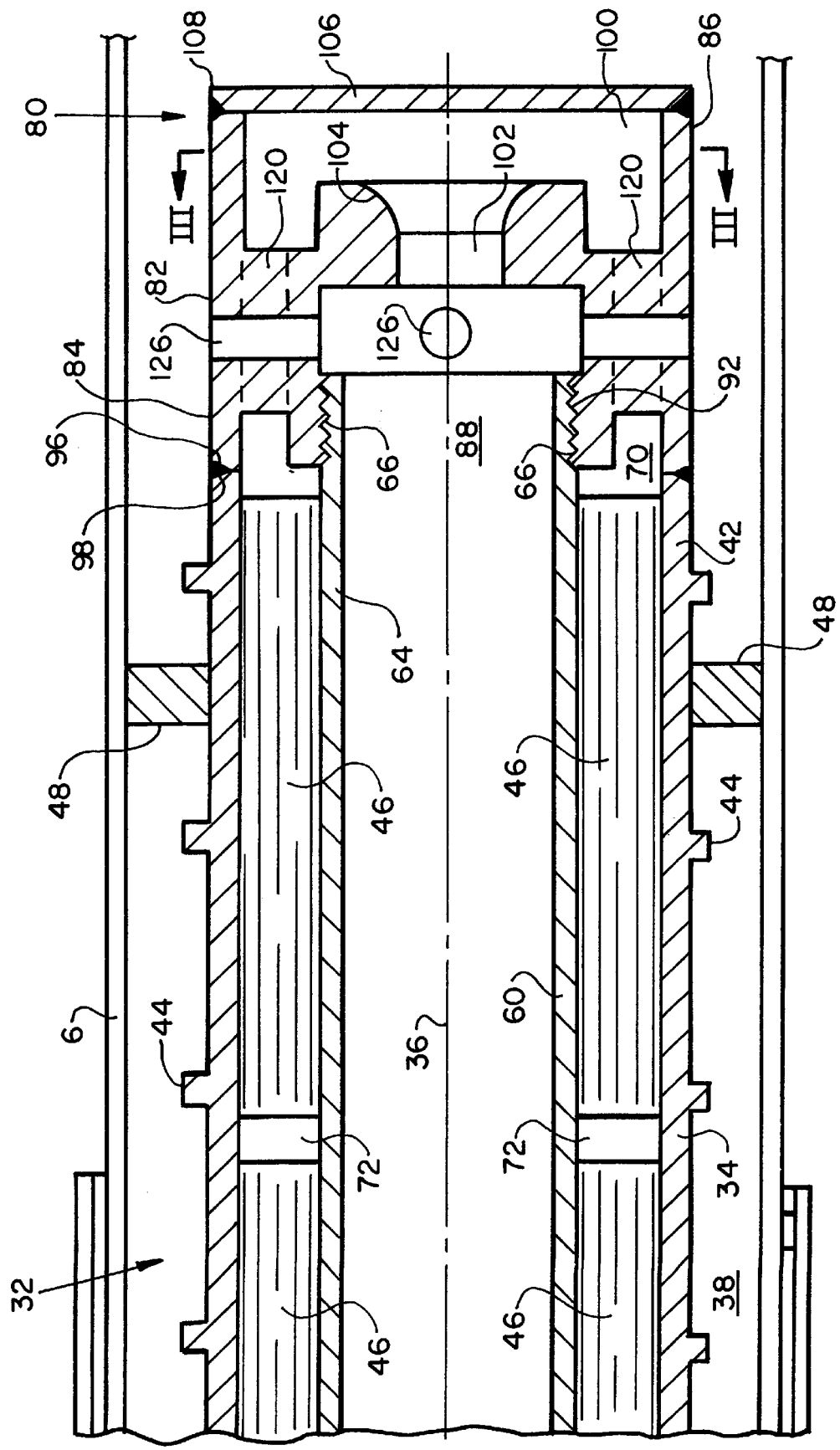
FIG. 2 is a longitudinal section of the recuperator of FIG. 1.

With reference to FIG. 2 and continuing reference to FIG. 1 of the drawings, a recuperator 32 is positioned inside the exhaust leg 6 and is utilized to mix part of the products of combustion 28 with combustion air and to provide the mixture to the burner leg 4 for combustion therein. The recuperator 32 includes a first outer tube or air tube 34, positioned substantially concentric with the central axis 36 of the exhaust leg 6 so that an annular exhaust passage or first annulus 38 is formed therebetween for the products of combustion 28 to flow to the exhaust port 30. The air tube 34 has a first end 40 forming a fluid tight connection with the plenum 16 and a second inner or hot end 42. In a preferred embodiment, a plurality of annular heat transfer fins 44 are formed on the outside of the air tube 34 and extend radially into the annular exhaust passage 38. Alternatively, the outside of the air tube 34 could have a plurality of continuous longitudinal ribs 46 extending parallel to the central axis. Alternatively, the ribs could be interrupted along their length and staggered around the circumference of the air tube 34. In yet another alterative, no ribs or fins are provided on the outside of the air tube 34. The finds 44 promote the transfer of heat from the products of combustion 28 flowing in the exhaust passage 38 to combustion air in the air tube 34. Standoffs 48 are provided between the air tube 34 and the exhaust leg 6 to maintain the spacing therebetween.

An air intake port 50 is positioned adjacent the first end 40 of the air tube 34 and connects the inside of the air tube 34 to a source of combustion air outside of the exhaust leg 6. A fan 54 positioned outside the exhaust leg 6 may be utilized to introduce combustion air into the air intake port 50.

A second inner tube or mixing tube 60 is positioned inside the air tube 34 and has a first outer end 62 that projects through the first end 40 of the air tube 34 and opens into the plenum 16 and a second inner or hot end 64 positioned adjacent to the hot end 42 of the air tube 34. The outside diameter of the hot end 64 of the mixing tube 60 has external threads 66 for a reason described hereinafter. The inside of the mixing tube 60 provides a path for fluid to flow between the hot end 64 of the mixing tube 60 and into the plenum 16. A fluid tight seal is formed at the connection of the first end 62 of the mixing tube 60 and the plenum 16. The mixing tube 60 is disposed substantially concentric with the central axis 36 and radially between the air tube 34 and the mixing tube 60. In a preferred embodiment, the longitudinal ribs 46 are staggered along their length so that longitudinal gaps 72 separate longitudinally adjacent ribs 46. Alternatively, no ribs or fins are provided between the air tube 34 and the mixing tube 60.

A mixing baffle 80 is positioned at the hot end 42 of the air tube 34 to enable the mixing of combustion air and the products of combustion 28 and for providing the mixture to the mixing tube 60. The mixing baffle 80 has a cylindrical body 82 that has a first end 84 positioned adjacent the hot end 42 of the air tube 34 and the hot end 64 of the mixing tube 60, and a second end 86 positioned at the upstream end of the recuperator 32 in the products of combustion 28.

The first end 84 of the mixing baffle 80 has a cylindrical cavity 88 formed therein. The cylindrical cavity 88 includes threads 92 formed on a portion of the inside diameter thereof for threadedly mating with the threads 66 formed on the mixing tube 60. The first end 84 of the mixing baffle 80 has an annular rim 96 for contacting an annular rim 98 of the hot end 42 of the air tube 34 when the mixing baffle 80 is threadedly engaged on the mixing tube 60. The mixing baffle 80 is secured to the hot end 42 of the air tube 34 by welding annular rim 96 to annular rim 98 to form a fluid tight seal therebetween. In this manner, the position of the mixing baffle 80 is fixed with respect to the hot end 42 of the air tube 34 and the hot end 64 of the mixing tube 60.

The second end 86 of the mixing baffle 80 has a cup-shaped cavity 100 formed therein concentric with the central axis 36. The mixing baffle 80 has a central bore 102 formed therein concentric with the central axis 36. The mixing baffle 80 also has a frusto-conical transition passage 104 providing a graduated passage between the cup-shaped cavity 100 and central bore 102. In a preferred embodiment, the transition passage 104 is beveled or has a radius to provide for a more uniform transition between the cup-shaped cavity 100 and the central bore 102. However, this is not to be construed as limiting the invention. In accordance with the present invention, the central bore 102 is smaller in cross-section than the cylindrical cavity 88 and the cup-shaped cavity 100 to restrict the flow of air therebetween. The mixing baffle 80 includes a circular cover 106 secured in a suitable manner, such as welding, to an annular rim 108 at second end 86 of the mixing baffle 80 so that a fluid tight seal is formed therebetween.

Figure 3:
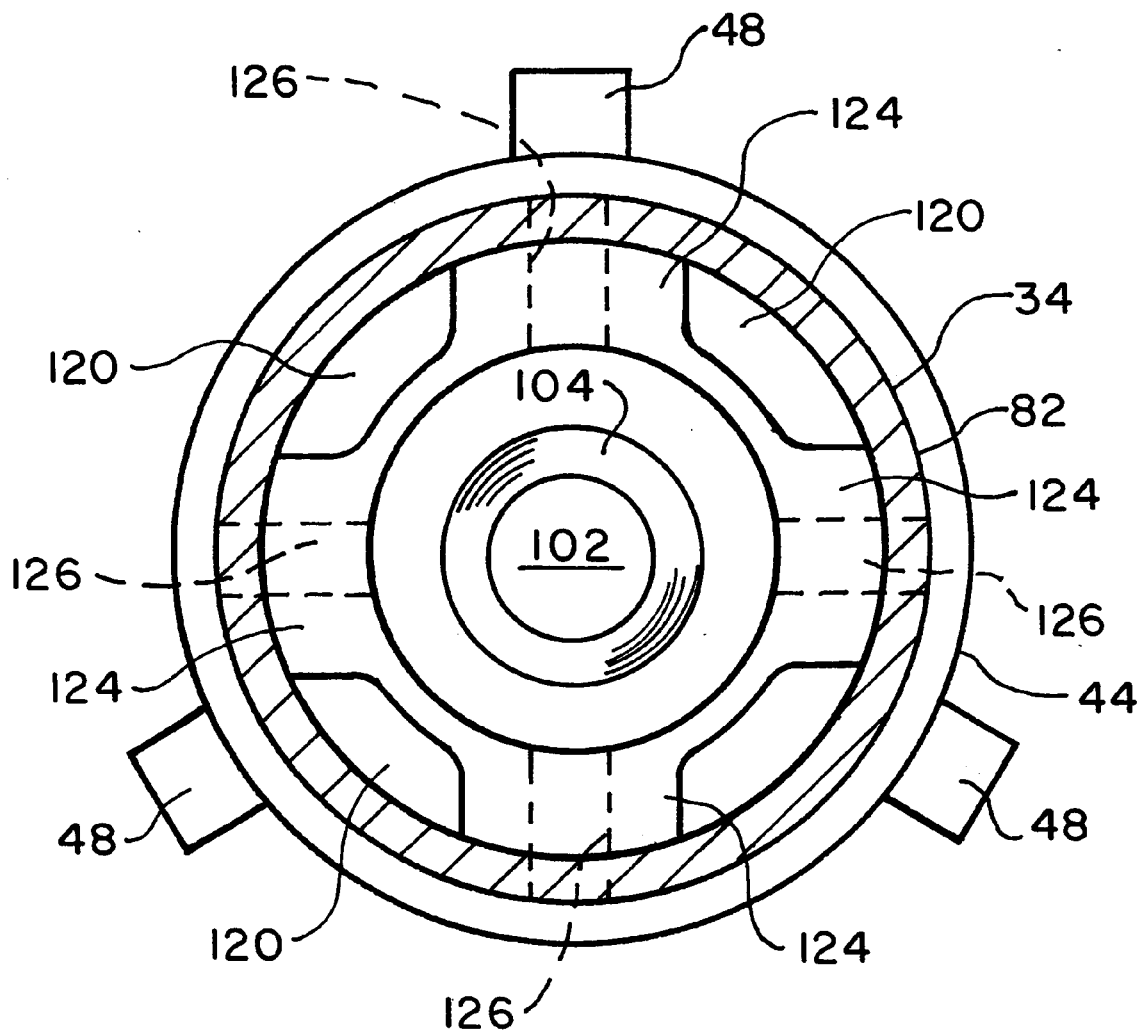
FIG. 3 is a section view taken along line III—III of FIG. 2.

With reference to FIG. 3, and with continuing reference to FIGS. 1 and 2 of the drawings, the mixing baffle 80 includes one or more longitudinal channels 120 located radially outward of and parallel to central bore 102. The channels 120 provide communication between the cup-shaped cavity 100 and the annular air passage 70. Radial members 124 separate adjacent channels 120. The members 124 have one or more radial bores or conduits 126 formed therein (shown in phantom in FIG. 3) extending between the outside of the cylindrical body 82 and the cylindrical cavity 88 adjacent the central bore 102.

In operation, the combustion of air and fuel in the burner leg 4 produces a stream of products of combustion or flue gases 28 that flows from the burner leg 4 to the annular exhaust passage 38 and exiting exhaust port 30. The products of combustion 28 contacting the outside surfaces of the mixing baffle 80 and the air tube 34 convey heat thereto.

The combustion of air and fuel in the burner leg 4 also forces or draws combustion air into the air intake port 50, through the annular air passage 70 toward the mixing baffle 80. The flow of combustion air from the air intake port 50 to the mixing baffle 80 flows through the one or more channels 120 in the mixing baffle 80 into the cup-shaped cavity 100. Air entering the cup-shaped cavity 100 is directed toward the cone shaped transition 104 and the central bore 102. The air flowing from the air intake port 50 to the central bore 102 is progressively heated by heat obtained from the air tube 34 and the mixing baffle 80. In accordance with the present invention, the mixing baffle 80 causes the direction of the air flow to be reversed so that the air is directed through the central bore 102 which directs the air along the air tube 60 toward the first end 40 of the air tube 34.

The flow of air between the cup-shaped cavity 100 and the air tube 60 is restricted by the central bore 102 which acts as a jet pump to increase the velocity of the air passing therethrough. This increase in velocity causes a reduction in the pressure of the combustion air which creates a negative pressure with respect to the pressure of the products of combustion 28 flowing through the exhaust passage 38. This negative pressure draws products of combustion 28 into the cylindrical cavity 88 from the annular passage 38 through the radial bores 126 for mixing with the heated air. This vitiated mixture flows through the mixing tube 60 and into plenum 16 which supplies it to the burner leg 4 for combustion therein.

It has been determined that providing a vitiated mixture in the range of about 18–19% oxygen to the burner leg 4 reduces NOX emissions to a desirable level. To this end, the diameter of the central bore 102 and the diameter of the radial bores 126 are selected so that a desired quantity of products of combustion 28 is mixed with the combustion air to provide a vitiated mixture in the range of about 18% oxygen. It is to be appreciated that the NOX emissions can be adjusted by appropriate selection of the diameter of the central bore 102 and the diameter of the radial bores 126.

In the preferred embodiment, the air tube 34 and the mixing baffle 80 are formed from suitable heat resistant material such as, without limitation, HE 28-10 stainless steel or ceramic.

In the above described embodiment, the cooperation of the air tube 34 and the exhaust leg forms an annular exhaust passage 38 and the cooperation of the mixing tube and the air tube forms an annular air passage 70. It will be appreciated, however, that the annular shapes of the exhaust passage and the air passage may be replaced by other suitable shapes without departing from the invention.

Figure 4B:
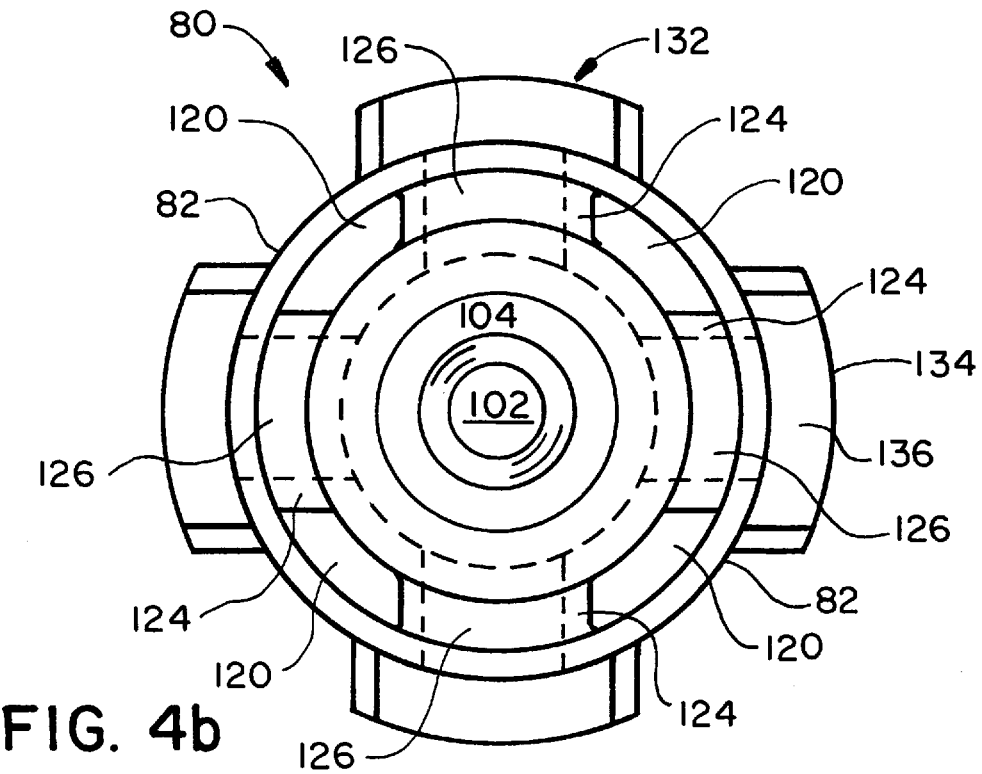
Figure 4A:
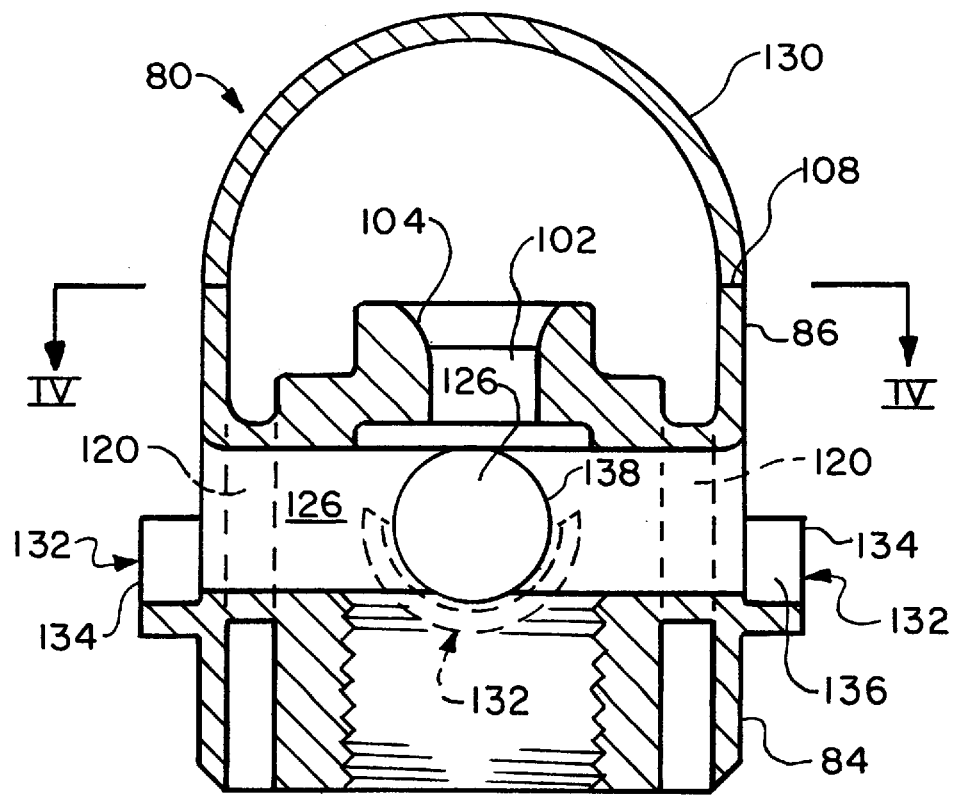
FIG. 4a is a broken plan view of a mixing baffle in accordance with another embodiment of the invention for use with the recuperative radiant tube of FIGS. 1 and 2.

With reference to FIGS. 4a–4b, and with continuing reference to FIGS. 1–3, in an alternate embodiment of the mixing baffle 80, the circular cover 106 can be replaced with a hemispherical or dome-shaped cover 130 fluid tightly secured to the annular rim 108 at the second end 86 of the mixing baffle 80. When the mixing baffle 80 of FIG. 4a–4b is positioned at the hot end 42 of the air tube 34, the dome-shaped cover 130 gradually diverts into the annular exhaust passage 38 the products of combustion 28 flowing into the exhaust leg 6 from the connecting leg 14. This gradual diversion reduces undesirable turbulence in the flow of products of combustion 28 in the annular exhaust passage 38, especially adjacent the conduits 126.

Moreover, the mixing baffle 80 can also include one or more flow directors 132 secured to the exterior of the cylindrical body 82 by welding, or other suitable manner. Each flow director 132 is positioned adjacent a conduit 126. In the embodiment shown in FIGS. 4a–4b, each flow director 132 is a radially extending wall 134 positioned between the first end 84 of the mixing baffle 80 and its corresponding conduit 126. Each wall 134 has a receiving surface 136 positioned facing the second end 86 of the mixing baffle 80 for receiving the products of combustion 28 flowing in the annular exhaust passage 38. Preferably, the receiving surface 136 of each wall 134 partially surrounds an outer rim 138 of its corresponding conduit 126. More preferably, the receiving surface 136 of each wall 134 is partially cylindrical and co-axial with the outer rim 138 of its corresponding conduit 126.

When the mixing baffle 80, shown in FIGS. 4a–4b, is positioned at the hot end 42 of the air tube 34, the walls 134 extended into the annular exhaust passage 38 and restrict the flow of products of combustion 28 therein. The walls 134 direct products of combustion 28 flowing in the annular exhaust passage 38 into their corresponding conduits 126.

Figure 5B:
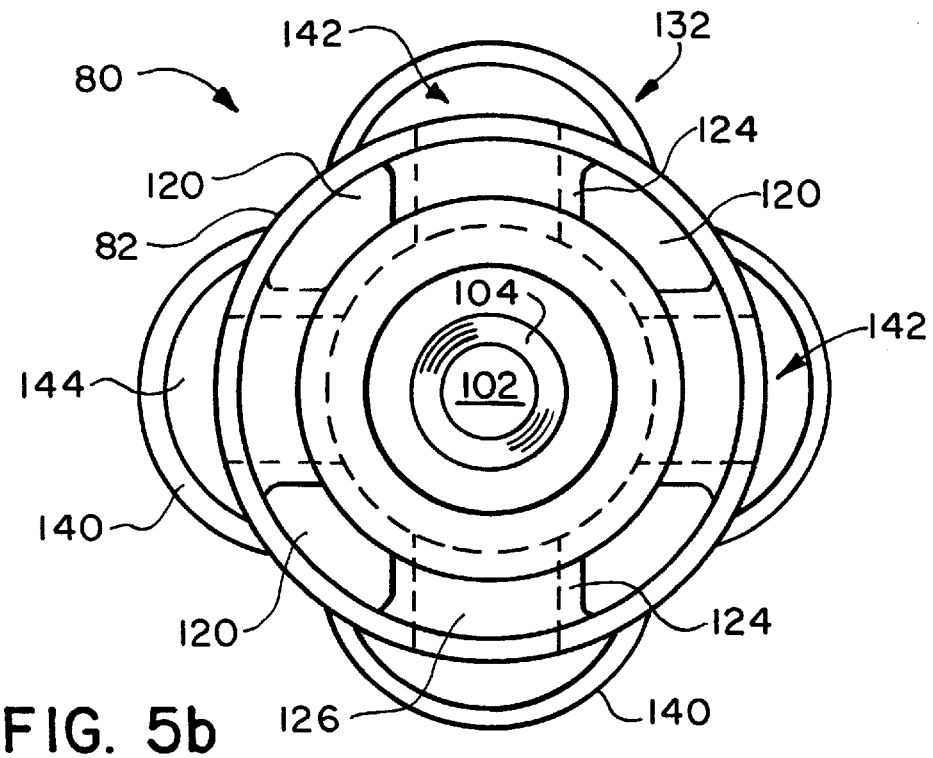
Figure 5A:
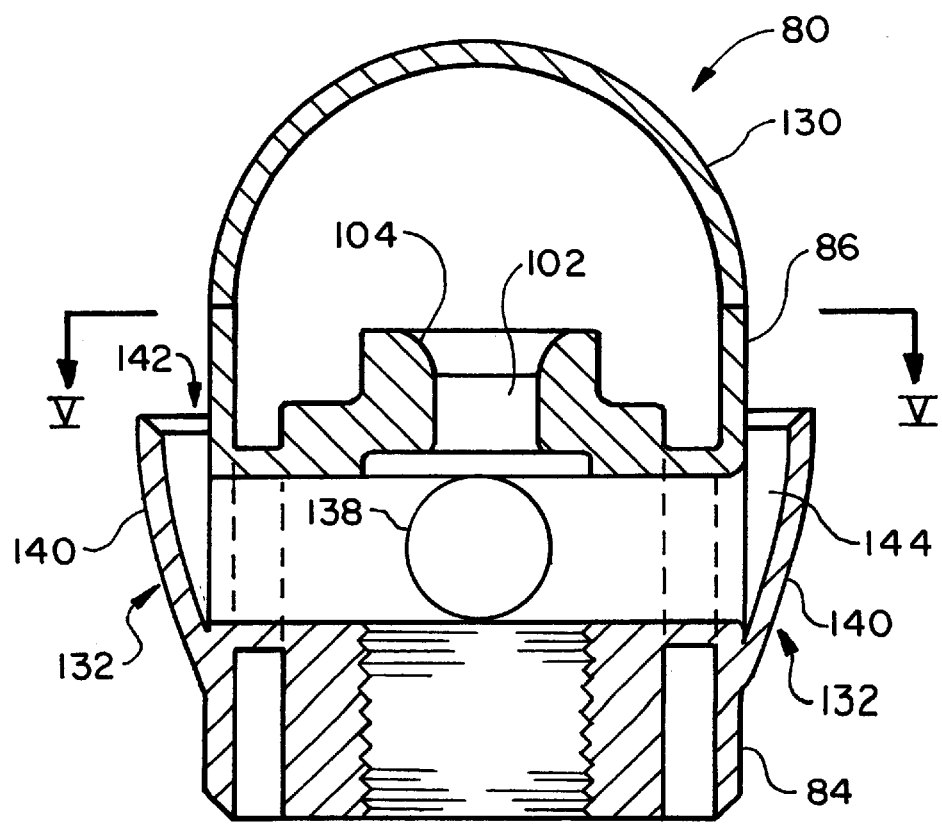
FIG. 5a is a broken plan view of a mixing baffle in accordance with another embodiment of the invention for use with the recuperative radiant tube of FIGS. 1 and 2.

In an another embodiment, shown in FIGS. 5a–5b, each flow director 132 is a hood-like cover or cowl 140 positioned over its corresponding conduit 126 and defining with the cylindrical body 82 an opening 142 which faces the second end 86 of the mixing baffle 80. Each cowl 140 co-acts with the cylindrical body 82 to form a graduated passage 144 from its opening 136 to its corresponding conduit 126.

When the mixing baffle 80, shown in FIGS. 5a–5b, is positioned at the hot end 42 of the air tube 34, the cowls 140 extend into the annular exhaust passage 38 so that the openings 142 receive products of combustion 28 flowing in the annular exhaust passage 38. The graduated passages 144 divert the products of combustion 28 received through the openings 142 into the conduits 126.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. A recuperator of a radiant tube burner assembly, the recuperator including a mixing baffle comprising:

a body having a first end, a second end and a side extending therebetween;

a jet pump positioned inside the body adjacent the first end, with the jet pump and the body defining a channel therebetween, with the jet pump having a graduated passage extending therethrough between the first end and the second end of the body and in fluid communication with the channel;

a conduit extending between the side of the body and a position adjacent the graduated passage; and a flow director positioned on the body adjacent the conduit, with the flow director configured so that when the mixing baffle is positioned in the furnace exhaust tube, the flow director directs into the conduit products of combustion flowing in the furnace exhaust tube.

2. The recuperator as set forth in claim 1, wherein the flow director is a cowl, the cowl and the body define an opening which is positioned facing the second end of the body, and the cowl and the body define a passage from the opening to the conduit.

3. The recuperator as set forth in claim 1, wherein the flow director includes a wall positioned between the conduit and the first end of the body.

4. The recuperator as set forth in claim 3, wherein the wall has a receiving surface positioned facing the second end of the body and the receiving surface partially surrounds the conduit.

5. The recuperator as set forth in claim 1, wherein the second end of the body has a hemispherical shape.

6. A recuperator for a radiant tube burner assembly having a radiant tube with a burner leg and an exhaust leg, a burner positioned in the burner leg, an exhaust port for discharging products of combustion from the exhaust leg, a fuel inlet for the burner and an air duct for conveying air mixed with products of combustion to the burner, the recuperator comprising:

a first outer air tube located within and radially spaced from the exhaust leg forming a first annular passage for conveying products of combustion in a first direction, with the air tube having an outer end connected to a source of air and an inner end;

a second inner mixing tube located within and radially spaced from the first outer air tube forming a second annular passage for conveying air in a second direction opposite the first direction and having an outer end and an inner end, with the outer end of the inner mixing tube in fluid communication with the air duct;

a mixing baffle positioned at the inner end of the first outer air tube and the inner end of the second inner mixing tube, with the mixing baffle having a restriction located at the inner end of the mixing tube for restricting the flow of air passing from the first outer air tube into the second inner mixing tube, a conduit positioned adjacent the restriction for providing fluid communication between the first annular passage in the exhaust leg and the mixing tube and a flow director positioned in the first annular passage adjacent the conduit, with the flow director configured to direct into the conduit products of combustion flowing in the first annular passage, wherein:

the restriction causes an increase in velocity of air flowing therethrough from the air tube to the mixing tube; and the increase in velocity causes a pressure differential between the mixing tube and the exhaust leg to draw products of combustion from the first annular passage into the mixing tube through the conduit.

7. The recuperator as set forth in claim 6 wherein the air tube and the exhaust leg are substantially concentric.

8. The recuperator as set forth in claim 6 wherein the air tube has at least one of a plurality of outwardly extending annular fins in the first annular passage and a plurality of longitudinally extending ribs in the first annular passage, wherein the longitudinally ribs are at least one of continuous, interrupted and staggered.

9. The recuperator as set forth in claim 6 further including a longitudinally extending rib extending radially between the air tube and the mixing tube, wherein the longitudinally extending rib is at least one of continuous, interrupted and staggered.

10. The recuperator as set forth in claim 6 wherein the mixing tube and the air tube are substantially concentric.

11. The recuperator as set forth in claim 6, wherein:

the mixing baffle includes a body having formed therein the conduit which extends between the first annular passage and the restriction which is positioned inside the body; and the flow director includes a cowl positioned over the conduit, with the cowl and the body defining an opening positioned to receive the products of combustion flowing in the first annular passage, with the cowl and the body defining a passage from the opening to the conduit.

12. The recuperator as set forth in claim 6, wherein:

the mixing baffle includes a body having formed therein the conduit which extends between the first annular passage and the restriction which is positioned inside the body; and the flow director includes a wall positioned between the conduit and the first outer air tube in the first annular passage.

13. The recuperator as set forth in claim 12, wherein the wall has a receiving surface positioned facing an end of the mixing baffle opposite the first outer air tube and the receiving surface partially surrounds the conduit.

14. A recuperative radiant tube apparatus for use with a furnace having a furnace wall defining an inside and an outside of the furnace, the recuperative radiant tube apparatus including:

a burner leg projecting through the furnace wall and having an end inside furnace and an end outside the furnace;

an exhaust leg projecting through the furnace wall and having an end inside the furnace and an end outside the furnace;

a connecting leg connecting the end of the burner leg inside the furnace and the end of the exhaust leg inside the furnace;

a duct connecting the end of the burner leg outside the furnace and the end of the exhaust leg outside the furnace; and a recuperator positioned inside the exhaust leg, the recuperator comprising:
  a first tube disposed in and radially spaced from the exhaust leg forming an annular exhaust gas passage between the exhaust leg and the first tube, the first tube having an outer end positioned adjacent the end of the exhaust leg outside the furnace and an inner end opposite the outer end of the first tube and extending towards the connecting leg;
  an inlet port adjacent the outer end of the first tube and adapted to connect the inside of the first tube to a source of combustion air;
  a second tube disposed in and radially spaced from the first tube and forming an annular air passage between the first tube and the second tube and having an outer end and an inner end, the annular air passage connecting the source of combustion air to the inner end of the first tube;
  a mixing baffle positioned between the inner end of the first tube and the inner end of the second tube, the mixing baffle comprising:
    a jet pump positioned at the inner end of the second tube for increasing the velocity of combustion air flowing from the annular air passage into the second tube;
    at least one port positioned adjacent the jet pump connecting the inside of the second tube to the annular exhaust gas passage, the at least one port providing a path for exhaust gas flowing in the annular exhaust gas passage to enter the second tube wherein the exhaust gas is mixed with combustion air, the duct conveying the mixture to the burner leg for combusting with fuel in the burner leg; and
    a flow director positioned in the annular exhaust gas passage adjacent the at least one port for directing into the at least one port exhaust gas flowing in the annular exhaust gas passage.

15. The recuperative radiant tube apparatus as set forth in claim 14, wherein the inner end of the first tube and the inner end of the second tube are positioned inside the furnace.

16. The recuperative radiant tube apparatus as set forth in claim 15 wherein the outer end of the first tube is positioned outside the furnace.

17. The recuperative radiant tube apparatus as set forth in claim 16 wherein the burner leg has a burner located therein, a fuel inlet for introducing fuel to the burner and an ignitor for igniting the combination of fuel and the mixture of exhaust gas and air to generate heat and products of combustion.

18. The recuperative radiant tube apparatus as set forth in claim 14 wherein the exhaust leg includes an exhaust port for exhausting products of combustion.

19. The recuperative radiant tube apparatus as set forth in claim 14, wherein:
  the mixing baffle includes a body having formed therein the at least one port which connects the inside of the second tube and the annular exhaust gas passage, with the mixing baffle having the jet pump positioned inside the body; and
  the flow director includes a cowl positioned over the conduit, with the cowl and the body defining an opening positioned to receive the products of combustion flowing in the annular exhaust gas passage, with the cowl and the body defining a passage from the opening to the conduit.

20. The recuperative radiant tube apparatus as set forth in claim 14, wherein:
  the mixing baffle includes a body having formed therein the at least one port which connects the inside of the second tube and the annular exhaust gas passage, with the mixing baffle having the jet pump positioned inside the body; and
  the flow director includes a wall positioned between the conduit and the first outer air tube in the annular exhaust gas passage.

21. The recuperative radiant tube apparatus as set forth in claim 20, wherein the wall has a receiving surface positioned facing the end of the mixing baffle opposite the first outer air tube and the receiving surface partially surrounds the conduit.

* * * * *